US010038525B2

(12) United States Patent
Nagaraj et al.

(10) Patent No.: US 10,038,525 B2
(45) Date of Patent: Jul. 31, 2018

(54) MANAGEMENT OF COORDINATED MULTI-POINT COMMUNICATION

(71) Applicant: Nokia Solutions and Networks Oy, Espoo (FI)

(72) Inventors: Shirish Nagaraj, Hoffman Estates, IL (US); Raghavendra M. Ramakrishna, Bangalore (IN); Christopher Schmidt, Pinole, CA (US); Phillip Rasky, Buffalo Grove, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 80 days.

(21) Appl. No.: 15/132,555

(22) Filed: Apr. 19, 2016

(65) Prior Publication Data
US 2016/0315743 A1 Oct. 27, 2016

(30) Foreign Application Priority Data
Apr. 27, 2015 (IN) ............................ 1168/DEL/2015

(51) Int. Cl.
*H04L 5/00* (2006.01)
*H04B 7/02* (2018.01)
(Continued)

(52) U.S. Cl.
CPC .............. *H04L 5/0035* (2013.01); *H04B 7/02* (2013.01); *H04B 7/024* (2013.01); *H04L 5/0051* (2013.01); *H04W 72/1268* (2013.01)

(58) Field of Classification Search
CPC ..... H04L 5/0035; H04L 5/0051; H04B 7/024; H04W 72/1268
See application file for complete search history.

(56) References Cited

U.S. PATENT DOCUMENTS 8,923,876 B2   12/2014   Comeau
2013/0058307 A1*   3/2013   Kim ...................... H04B 7/024
                                                  370/329
(Continued)

FOREIGN PATENT DOCUMENTS

WO   2014/068458 A1   5/2014

OTHER PUBLICATIONS

Nagaraj, Shirish, et al., "Methods and Apparatus for Coordinated Multipoint Communication", U.S. Appl. No. 62/052,422, filed Oct. 10, 2014.

*Primary Examiner* — Omar J Ghowrwal
(74) *Attorney, Agent, or Firm* — Harrington & Smith

(57) ABSTRACT

The embodiments of the invention provide at least a method and apparatus to schedule an uplink communication from a user equipment of a plurality of user equipment; identify one or more candidate cells to support the uplink communication from the user equipment; send a request to the identified one or more candidate cells for requesting at least one of antenna data and pilot symbols from the one or more candidate cells for the uplink communication from the user equipment; and in response to the request, receive the uplink communication from the user equipment via a coordinated multi-point operation using at least in part a reception cells of the one or more candidate cells. Further, to receive, by one or more candidate cell, from a serving cell a request for at least one of antenna data and pilot symbols from the one or more candidate cells for a scheduled uplink communication from a user equipment to the serving cell; and in response to the request, provide the at least one of antenna data and pilot symbols for the uplink communication from a user equipment to the serving cell.

20 Claims, 7 Drawing Sheets

(51) Int. Cl.
*H04B 7/024* (2017.01)
*H04W 72/12* (2009.01)

(56) References Cited

U.S. PATENT DOCUMENTS

| | | | |
|---|---|---|---|
| 2014/0029648 A1* | 1/2014 | Jin | H04B 1/71072 |
| | | | 375/148 |
| 2014/0349654 A1* | 11/2014 | Li | H04W 36/20 |
| | | | 455/437 |
| 2015/0023283 A1* | 1/2015 | Liu | H04W 48/20 |
| | | | 370/329 |
| 2016/0105221 A1 | 4/2016 | Nagaraj et al. | |

* cited by examiner

MANAGEMENT OF COORDINATED MULTI-POINT COMMUNICATION

PRIORITY

This application claims priority under 35 U.S.C. 119(a) to "Method for Managing Coordinated Multipoint Communication," India Patent Application No. 1168/DEL/2015 filed on Apr. 27, 2015 and incorporated herein by reference in its entirety.

TECHNICAL FIELD

The teachings in accordance with the embodiments of this invention relate generally to enabling uplink coordinated multipoint communications and, more specifically, relate to enabling uplink coordinated multipoint communications with backhaul constraints.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
CA carrier aggregation
CoMP coordinated multi-point
DMRS demodulation reference signal
eNB base station
IIR infinite-impulse-response
ISM industrial, scientific, medical
LTE long term evolution
MAAS multi-antenna aperture selection
RSRP reference signal received power
SINR signal to interference and noise ratio
TTI transmission time interval
UL uplink
WIFI wireless fidelity In LTE-Advanced focus is on higher capacity, the driving force to further develop LTE towards LTE-Advanced was to provide higher bitrates in a cost efficient way.

As LTE-Advanced continues to evolve and new CA configurations are added (additions of new bands for CA are not bound to specific releases) and there are features introduced in releases of the 3 GPP specifications, such as relating to Coordinated Multi Point (CoMP) communication. CoMP is intended to improve network performance at cell edges and for capacity enhancements for dense networks for example. In CoMP a number of TX (transmit) points provide coordinated transmission in the DL, and a number of RX (receive) points provide coordinated reception in the UL. A TX/RX-point constitutes of a set of co-located TX/RX antennas providing coverage in the same sector. The set of TX/RX-points used in CoMP can either be at different locations, or co-sited but providing coverage in different sectors, they can also belong to the same or different eNBs. CoMP can be done in a number of ways, and the coordination can be done for both homogenous networks as well as heterogeneous networks. The invention works to provide a benefit to CoMP communications.

SUMMARY

In an example aspect of the invention, there is a method comprising scheduling, by a serving cell, an uplink communication from a user equipment of a plurality of user equipment; identifying, by the serving cell, one or more candidate cells to support the uplink communication from the user equipment; sending, by the serving cell, a request to the identified set of candidate cells for requesting for at least one of antenna data and pilot symbols from the one or more candidate cells for the uplink communication from the user equipment; and in response to the request, receiving the uplink communication from the user equipment via a coordinated multi-point operation using at least in part reception cells of the one or more candidate cells.

In another example aspect of the invention, there is an apparatus comprising: means for scheduling, by a serving cell, an uplink communication from a user equipment of a plurality of user equipment; means for identifying, by the serving cell, one or more candidate cells to support the uplink communication from the user equipment; means for sending, by the serving cell, a request to the identified one or more candidate cells for requesting at least one of antenna data and pilot symbols from the one or more candidate cells for the uplink communication from the user equipment; and means, in response to the request, for receiving the uplink communication from the user equipment via a coordinated multi-point operation using at least in part reception cells of the one or more candidate cells.

In another example aspect of the invention, there is an apparatus comprising at least one processor; and at least one memory including computer program code, where the at least one memory and the computer program code are configured, with the at least one processor, to cause the apparatus to at least: schedule an uplink communication from a user equipment of a plurality of user equipment; identify one or more candidate cells to support the uplink communication from the user equipment; send a request to the identified one or more candidate cells for requesting at least one of antenna data and pilot symbols from the one or more candidate cells for the uplink communication from the user equipment; and in response to the request, receive the uplink communication from the user equipment via a coordinated multi-point operation using at least in part reception cells of the one or more candidate cells.

A computer program product including a non-transitory memory embodying computer program code, the computer program code executed by at least one processor to perform operations comprising: scheduling an uplink communication from a user equipment of a plurality of user equipment; identify one or more candidate cells to support the uplink communication from the user equipment; sending a request to the identified one or more candidate cells for requesting at least one of antenna data and pilot symbols from the one or more candidate cells for the uplink communication from the user equipment; and in response to the request, receiving the uplink communication from the user equipment via a coordinated multi-point operation using at least in part reception cells of the one or more candidate cells.

In another example aspect of the invention, there is a method comprising: receiving, by one or more candidate cells, from a serving cell a request for at least one of antenna data and pilot symbols from the one or more candidate cells for a scheduled uplink communication from a user equipment to the serving cell; and in response to the request, providing the at least one of antenna data and pilot symbols for the uplink communication from a user equipment to the serving cell.

In still another example aspect of the invention, there is an apparatus comprising: means for receiving, by one or more candidate cells, from a serving cell a request for at least one of antenna data and pilot symbols from the one or more candidate cells for a scheduled uplink communication from a user equipment to the serving cell; and means, in response to the request, for providing the at least one of antenna data and pilot symbols for the uplink communication from a user equipment to the serving cell.

In yet another example aspect of the invention, there is an apparatus comprising at least one processor; and at least one memory including computer program code, where the at least one memory and the computer program code are configured, with the at least one processor, to cause the apparatus to at least: receive, by one or more candidate cell devices, from a serving cell a request for at least one of antenna data and pilot symbols from the one or more candidate cells for a scheduled uplink communication from a user equipment to the serving cell; and in response to the request, provide the at least one of antenna data and pilot symbols for the uplink communication from a user equipment to the serving cell.

A computer program product including a non-transitory memory embodying computer program code, the computer program code executed by at least one processor to perform operations comprising: receiving, by one or more candidate cells, from a serving cell a request for at least one of antenna data and pilot symbols from the one or more candidate cells for a scheduled uplink communication from a user equipment to the serving cell; and in response to the request, providing the at least one of antenna data and pilot symbols for the uplink communication from a user equipment to the serving cell.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

Some embodiments of the invention propose a method and apparatus to enable uplink coordinated multipoint communications with backhaul cooperation and/or with the constraint of bandwidth restrictions.

Some embodiments of the invention relate to the problem of how to enable distributed uplink CoMP in a wireless network with back-haul co-operation with the constraint of bandwidth restrictions. This can happen in various types of deployments where distributed nodes are connected by wired or wireless links.

Figure 1:
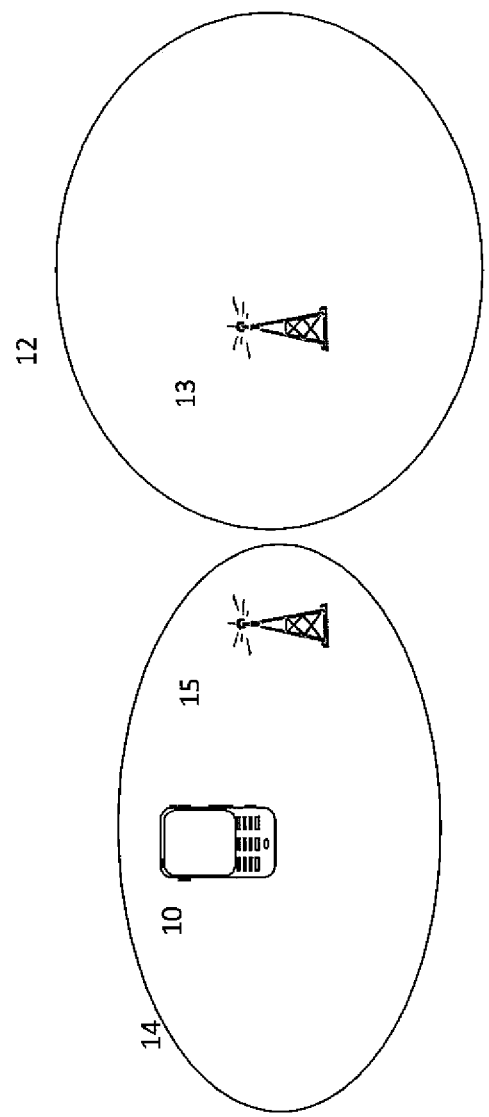
FIG. 1 is a diagram illustrating an example of a User Equipment (UE) in partially overlapping cells.

FIG. 1 is a diagram illustrating an example of a User Equipment (UE) in partially overlapping cells. Referring to FIG. 1, UE 10 is connected to one cell at a time. Further, the UE 10 may be heard at neighboring cells also. In this example the UE 10 is connected to a Serving Cell 14 through a base station 15 and also received at Helper Cell 12 through a base station 13. It is noted that the example embodiments of the invention can apply to any of these scenarios.

As indicated above a coordinated multipoint (CoMP) transmission can enable dynamic coordination or transmission and reception of the traffic with multiple geographically separated devices such as eNBs or co-located devices within the same eNB. An aim of CoMP is to utilize resources more effectively to enhance the overall service quality and system performance. Some embodiments of the invention relate to the problem of how to enable distributed uplink CoMP in a wireless network with back-haul co-operation with the constraint of bandwidth restrictions.

Enabling co-operation among nodes (for example, uplink co-operation requires sending signal samples from "helper" cell to the "recipient") there is a need for backhaul network over which such exchanges are possible. The co-operation can happen in centralized way where the cells exchange signals with the central unit or in distributed fashion where the cells directly exchange data with other cells. The distributed co-operation has attracted interest for its scalable solution. Ideally, when we do not have any architectural constraints, it is possible to have co-operation from all the "helper" cells. However, in practice depending on the deployment and hardware architecture, the backhaul bandwidth can be severely limiting. In some embodiments of the invention, serving cell does smart helper requests and restrict their "ingress" bandwidth and as a helper cell does smart "egress" control when they are oversubscribed with help requests. In this disclosure, we have presented adaptive helper cell management and egress bandwidth control mechanisms that can work across different deployments and architectures. The management and control mechanisms may be covered with the following areas:

Distributed UL CoMP

Helper cell management

Egress bandwidth control

Figure 2:
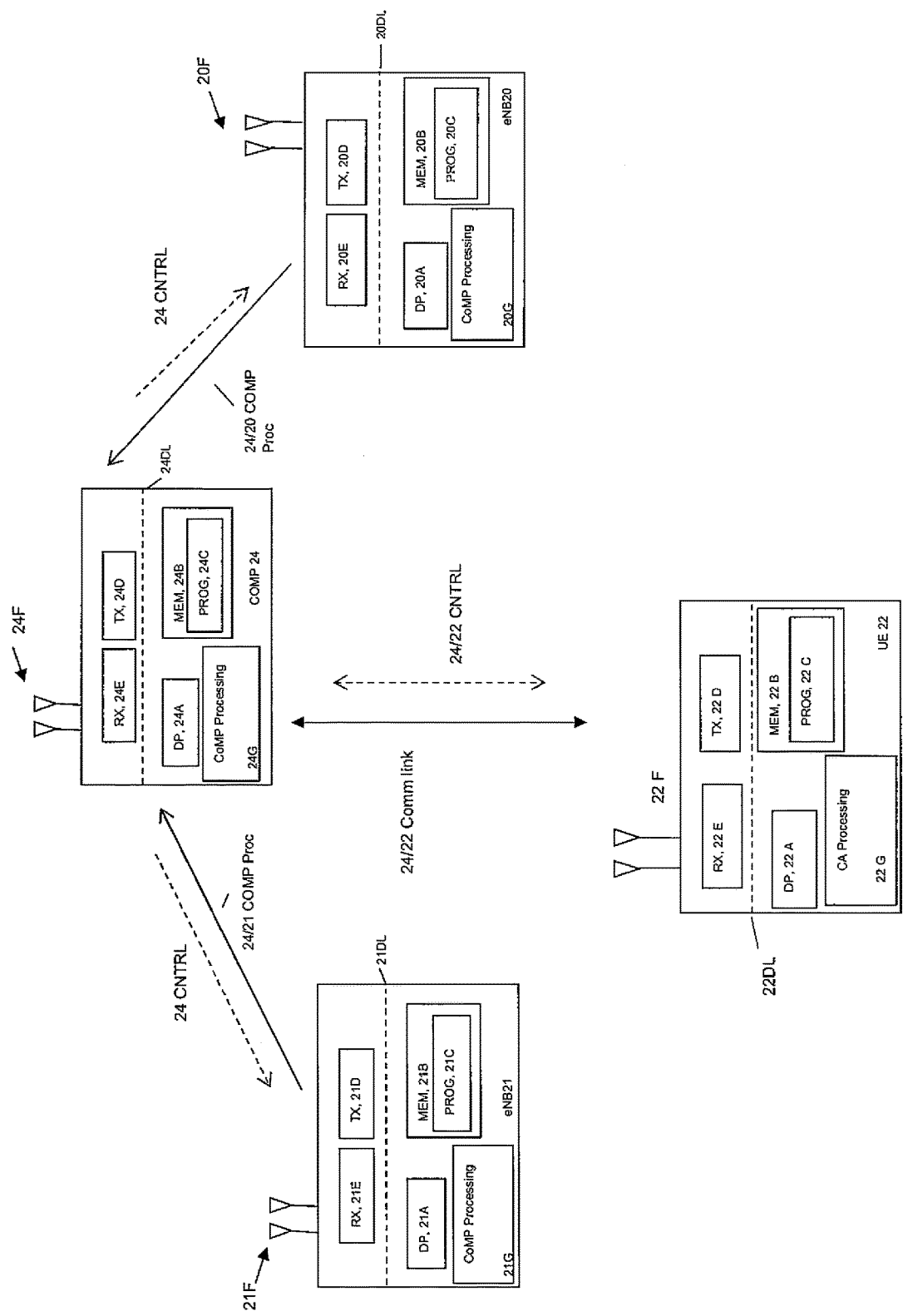
FIG. 2 shows a simplified block diagram of devices which may be configured to perform operations in accordance with some embodiments of the invention.

Before describing some embodiments of the invention in further detail reference is now made to FIG. 2. FIG. 2 illustrates a simplified block diagram of various electronic devices and apparatus that are suitable for use in practicing embodiments of this invention. As shown in FIG. 2, a COMP 24 device is adapted for communication over at least wireless links (not specifically shown) with mobile apparatuses, such as mobile terminals including a device such as UE 22, and/or other devices such as ENB 20 and ENB 21. In addition, in accordance with some embodiments the COMP 24, ENB 20, and/or ENB 21 may be any device including a base station, a macro eNodeB (a base station of an E-UTRAN system and/or 5G system), a WLAN access point, a femto eNodeB, pico eNodeB, Serving GW, a server, or other type of node or apparatus associated with a network and adapted to perform some embodiments as discussed herein. Further, it is noted that a number of network devices which operate to perform some embodiments of the invention are not limited to any number shown in FIG. 2 or any other Figure. There may be more of less devices, and the devices can be located in a same cell or in different cells.

As illustrated in FIG. 2, the COMP 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E for bidirectional wireless communications with devices ENB 20, ENB 21, and/or UE22 or any other network device via its antenna 24F. The COMP 24 stores at block 24G in its local MEM 24B CoMP processing code to perform a method enabling uplink coordinated multipoint communications with backhaul cooperation with the constraint of bandwidth restrictions as in accordance with some embodiments.

The eNB 21 similarly includes processing means such as at least one data processor (DP) 21A, storing means such as at least one computer-readable memory (MEM) 21B storing at least one computer program (PROG) 21C, and communicating means such as a transmitter TX 21D and a receiver RX 21E for bidirectional wireless communications with the UE 22, COMP 24 of FIG. 2 as well as the other apparatus or other network device via one or more antennas 21R The eNB 21 stores in its local MEM 21B at block 21G computer program code for CoMP processing to perform, for example, carrier aggregation controlling processing, for performing, for example, operations based on data packets it receives, such as from the UE 22 and/or COMP 24, and to utilize that processing such as for activating, controlling, and/or coordinating carrier communications.

The ENB 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with any of the COMP 24, and/or the UE 22 via one or more antennas 20F. The RX 20E and the TX 20D are each shown as being embodied in a radio-frequency front end chip, which is one non-limiting embodiment. The ENB 20 also has stored in the MEM 20B at block 20G computer program code for CoMP processing to perform some example operations as discussed herein.

The UE 22 includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the COMP 24 of FIG. 2 as well as the other apparatus or other network device via one or more antennas 22F. The UE 22 has stored in its local MEM 22B at block 22G computer program code.

In accordance with some embodiments of the invention, there can be CoMP processing information such as indicated by arrows 24/21, 24/20, which may be used by the COMP 24, ENB 20, ENB 21, to perform the operations in accordance with some embodiments. Further, this information can include CoMP control signaling in accordance with some embodiments of the invention such as illustrated by the dashed line arrows 24 CNTRL from the COMP 24. Further there is a 24/22 Comm link and a 24/22 CNTRL link between the serving cell 21 and the UE 22. In addition, it is noted that any of the links as illustrated in FIG. 2 can comprise backhaul links for use in accordance with some embodiments of the invention.

Further, in some embodiments of the invention, each of the steps as disclosed herein including the CoMP controlling may be based on information detected and/or shared by the ENB 20, ENB 21, UE22, and COMP 24 or information received via the antenna 20F, 21F, 22F, and/or 24F as well as associated receivers RX 20E, 21E, 22E, and 24E. Such information from any one or more of the ENB 20, ENB 21, UE22, and/or the COMP 24 can be processed and implemented by at least one of the PROGs 20C, 21C, 22C, and/or 24C in the respective device ENB 20, ENB 21, UE22, and/or COMP 24. Each of the PROGs 20C, 21C, 22C, and/or 24C is assumed to include program instructions that, when executed by the associated DP 20A, 21A, 22A, and/or 24A enable the device to operate in accordance with some embodiments of this invention to perform the operations as detailed herein. Blocks 20G, 21G, 22G, and 24G summarize different results from executing different tangibly stored software to implement certain aspects of these teachings. In these regards some embodiments of this invention may be implemented at least in part by computer software stored on the MEM 20B, 21B, 22B, and/or 24B which is respectively executable by DP 20A, 21A, 22A, and 24A, or by hardware, or by a combination of tangibly stored software and hardware (and tangibly stored firmware).

In addition, the dashed lines 20DL, 21DL, 22DL, and 24DL of FIG. 2 indicate that the radio parts of the ENB 20, eNB 21, UE 22, and/or COMP 24 are not essential and may be separate from at least a processor and carrier aggregation control instructions of the COMP 24, ENB 20, and/or ENB 21 of FIG. 2. Each of the RX 24E, TX 24D, and antenna 24F; the RX20E, TX20D and antenna 20F; the RX21E, TX21D and antenna 21F; and/or the RX22E, TX22D and antenna 22F, of the COMP 24, ENB 20, eNB 21 and/or UE 22, respectively, are not essential to the operations in accordance with some embodiments of the invention. In accordance with non-limiting embodiments of the invention the COMP 24, ENB 20, ENB 21, and/or UE 22 may be coupled to external radio parts for sending or receiving signaling via circuitry such as integrated circuitry.

Electronic devices implementing some aspects of the invention need not be the entire devices as depicted at FIG. 2, but some embodiments may be implemented by one or more components of same such as the above described tangibly stored software, hardware, firmware and data processor.

In some embodiments of the invention, computer readable MEMs 20B, 21B, 22B, and 24B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 21A, 22A, and 24A include but are not limited to general purpose computers, special purpose computers, microprocessors, digital signal processors (DSPs) and multi-core processors.

While various example embodiments have been described above it should be appreciated that the practice of the invention is not limited to the example embodiments shown and discussed here. Various modifications and adaptations to the foregoing example embodiments of this invention may become apparent to those skilled in the relevant arts in view of the foregoing description.

Further, some of the various features of the above non-limiting embodiments may be used to advantage without the corresponding use of other described features.

Initially we will discuss the functions that are required to enable UL-CoMP and their functionalities. In distributed UL CoMP, the CoMP functionality is distributed between all participating cells. The request/response, master/slave interaction between a serving cell and its neighboring helper cells perform request/response, master/slave interactions, with the intelligence concentrated in the serving cell function. All participating cells perform both serving cell and helper cell functions. Some embodiment of the invention disclose a method whereby a scheduling interval (e.g. TTI), the serving cells determine, per scheduled UE, a set of helper cells to instruct to send symbols from the UEs RB allocation (antenna data) as received by the helpers, and/or pilot symbols from the UEs RB allocation, and in addition, a method to manage the case where a helper cell is oversubscribed with regards to an available front-haul bandwidth. For example, in a TTI:

the serving cell determines, for a scheduled UE that can benefit from UL CoMP, a set of helpers to request antenna data from (e.g. the UEs allocated UL RBs received at the helper, including pilot symbols).

the serving cell determines, for the scheduled UE that can benefit from UL CoMP, a set of helpers to request only pilots from (e.g. pilot symbols in the UEs RB allocation received by the helper).

In some embodiment of the invention, the helper cells, upon request from a serving cell, send the requested pre/post combined antenna data and/or pilot symbols. It is noted that the data may include a combination of pre/post antenna data. The antenna data is then used by the serving cells UL CoMP receiver to decode the UEs UL transmission. In some embodiment of the invention, the serving cell uses the pilot symbols received from the helpers to maintain IIR filtered SINR metrics of potential helpers for active UE(s) that can benefit from UL CoMP.

Figure 3:
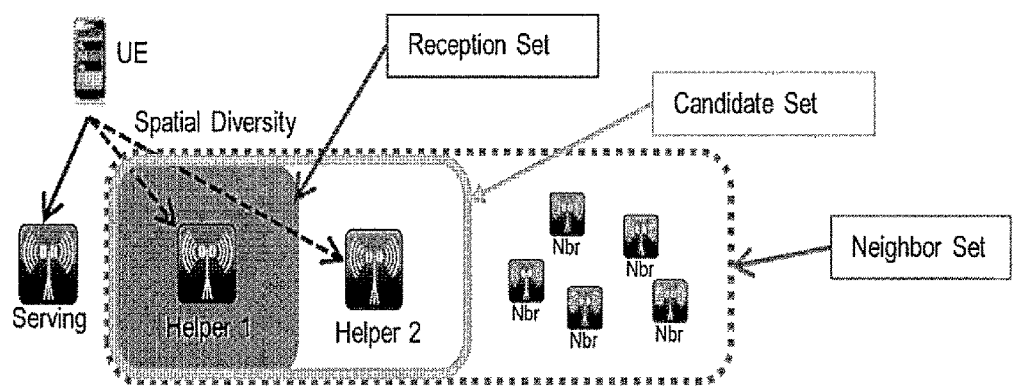
FIG. 3 shows helper cell management in accordance with some embodiments of the invention.

FIG. 3 illustrates an example of a neighbor set of carriers for spatial diversity of a transmission. As shown in FIG. 3 there is a neighbor set defined per cell, a Candidate Set 02 per user equipment (e.g., UE 22), and a Reception Set 01 per UE per TTI. The Neighbor Set 03 is defined per cell and includes cells with an RF topological relationship to the serving cell, such that they can potentially be helpers to some UE in the serving cell. The Candidate Set is per UE and includes neighbor cells that are requested to provide reference signals (e.g. DMRS) sent from UE in the serving cell. The Reception Set is per UE per TTI and includes neighbor cells that are requested to provide UL data and pilot symbols sent from UE in the serving cell. The neighbor cell moves into UE's candidate set based on for example UE Measurement Reports. The candidate cell moves into UE's reception set based on an SINR estimate from candidate cell antenna data (e.g. pilot symbols). It is noted that SINR estimates for the candidate and reception set cells can be computed in serving cell.

Enabling uplink joint reception CoMP may require co-operation among the cells in exchanging pre/post-processed antenna data signals, such as pre/post antenna data signals. Cells exchange pre/post combined antenna data, such as combined pre/post antenna data, (hence distributed UL CoMP) over communications links to create more diversity and interference rejection capability in LTE reception. Demodulation and decoding of all antenna data is accomplished at the serving cell. In distributed UL-CoMP, the CoMP functionality is split between all participating cells. UL-CoMP with distributed architecture has attracted more attention over centralized architecture due to its scalability and signaling latency. The distributed UL-CoMP solution has the following key components.

For distributed UL-CoMP functionalities, the serving (or primary) cell is the one in which the core network has attached a UE for wireless communication, backhaul is a name for a communication link to neighboring cells, and Core-Backhaul is a name for a communication link to the core LTE network.

Scan receiver measures potential helpers from neighbors using pilots symbols from requested over the backhaul;

Helper selection uses scan receiver output and long term metrics to select helper cells for UE reception (per TTI). This may be done to improve diversity performance and reduces "backhaul" bandwidth utilization;

Help Request is signaling to neighbor cells for scheduled receptions to forward pre/post combined antenna data in form of resource blocks for demodulation of data or pilot symbols for scanning;

Egress Control manages backhaul (and if same, core-backhaul) so it may not overflow with sum of help requests and help targeted for neighbor cells; and Compression may optionally be used to further reduce backhaul.

Algorithms for two key-functionalities include Helper cell management and Egress bandwidth control.

Helper Cell Management:

The following are some examples of the functionalities of helper cell management:

SINR estimation at the serving cell,

IIR filtered SINR estimate at the serving cell for serving cell UEs at—their helper cells, Per TTI selection of helper cells per UE, A signaling request from the serving cell to UE selected helper cells, requesting transmission of the post FFT UE RB allocation (pre/post antenna combined)

A method for per UE candidate helper cell determination, and per UE reception set cell determination, A signaling request from the serving cell to UE selected candidate cell not requested for helper RBs, requesting transmission of the DMRS pilot(s) associated with the UEs RB allocation, A method to determine, per UE, a candidate set of helpers that may potentially provide help, and a per TTI determination of a Reception Set that will provide help, which is a subset of the candidate set, and/or Transmission of help requests from serving cells to helper cells when UEs are scheduled for UL transmission, where the help request includes an Egress Control Metric for UEs help request In some embodiment of the invention, the serving cell identifies potential helper cells, the 'candidate set' from neighbor set, for example a neighbor cell set for some active UEs. We can use measurement reports along with RSRP thresholds to identify the candidate set. Existing measurement reports scheduled for example to support handover can be used to continuously update the candidate set. In addition, measurement reports can be scheduled specifically to support updating the candidate set for UL CoMP. A scanning function can also be used over a wide set of neighbor cells to identify a set of candidate cells. This scanning of neighbors to determine if they have become viable candidate cells can occur at a slow rate, for example every Nth TTI.

In some embodiment of the invention, the scanning function is performed by the serving cell function, where the serving cell 'scans' cells in UEs candidate set. The scanning function operates as follows—time a UE is scheduled, the serving cell requests from the UEs candidate set cells the pilot symbols in the UEs RB allocation, either sent from the helper with all the RB symbols in the UEs allocation, or with the helper sending just the pilot symbols. The pilots are used to maintain an IIR filtered SINR estimate for UEs candidate set cells. There is a corresponding scanning function in the helper cells, where the helper is requested to send back just the pilot symbols to the serving cell.

In some embodiment of the invention, a reception set selection function is performed by the serving cell, for example in a TTI, where the serving cell determines, from the IIR filtered SINR estimate for UEs candidate set cells, the reception set for scheduled UE. The reception set cells will be requested to send the symbols for the UEs RB allocation to the serving cell. The selection function uses the candidate cells IIR filtered SINR, and other information, including the egress bandwidth price provided by neighbors.

In some embodiment of the invention, an egress bandwidth price function is performed at helper cell that determines the egress bandwidth price and distributes it to all other cells. It is noted that in accordance with some embodiments of the invention an egress bandwidth price function can be included (e.g., used in a quasi-real time liquid MAAS algorithm rather than in a Liquid MAAS algorithm).

Figure 4:
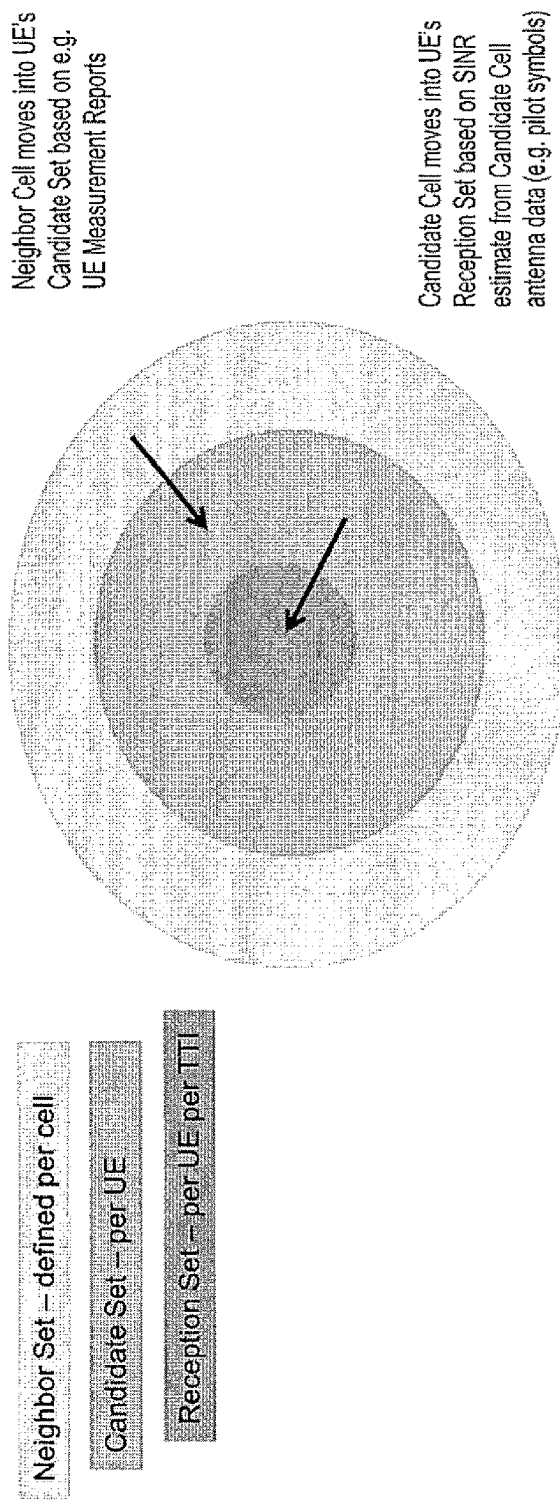
FIG. 4 shows dynamic helper cell selection in accordance with some embodiments of the invention.

FIG. 4 shows an example of a dynamic helper cell selection. It is shown that hierarchical sets of helper cells can reduce the amount of antenna data sharing required to identify the ideal helper cells for a specific UE for a specific TTI. As shown in FIG. 4 the Neighbor Cell 003 moves into UE's Candidate Set based on e.g. UE Measurement Reports, and the Candidate Cell 002 moves into UE's Reception Set such as based on SINR estimate from candidate cell antenna data (e.g. pilot symbols). It is noted that SINR estimates for Candidate and Reception Set cells are computed in Serving Cell.

Figure 5:
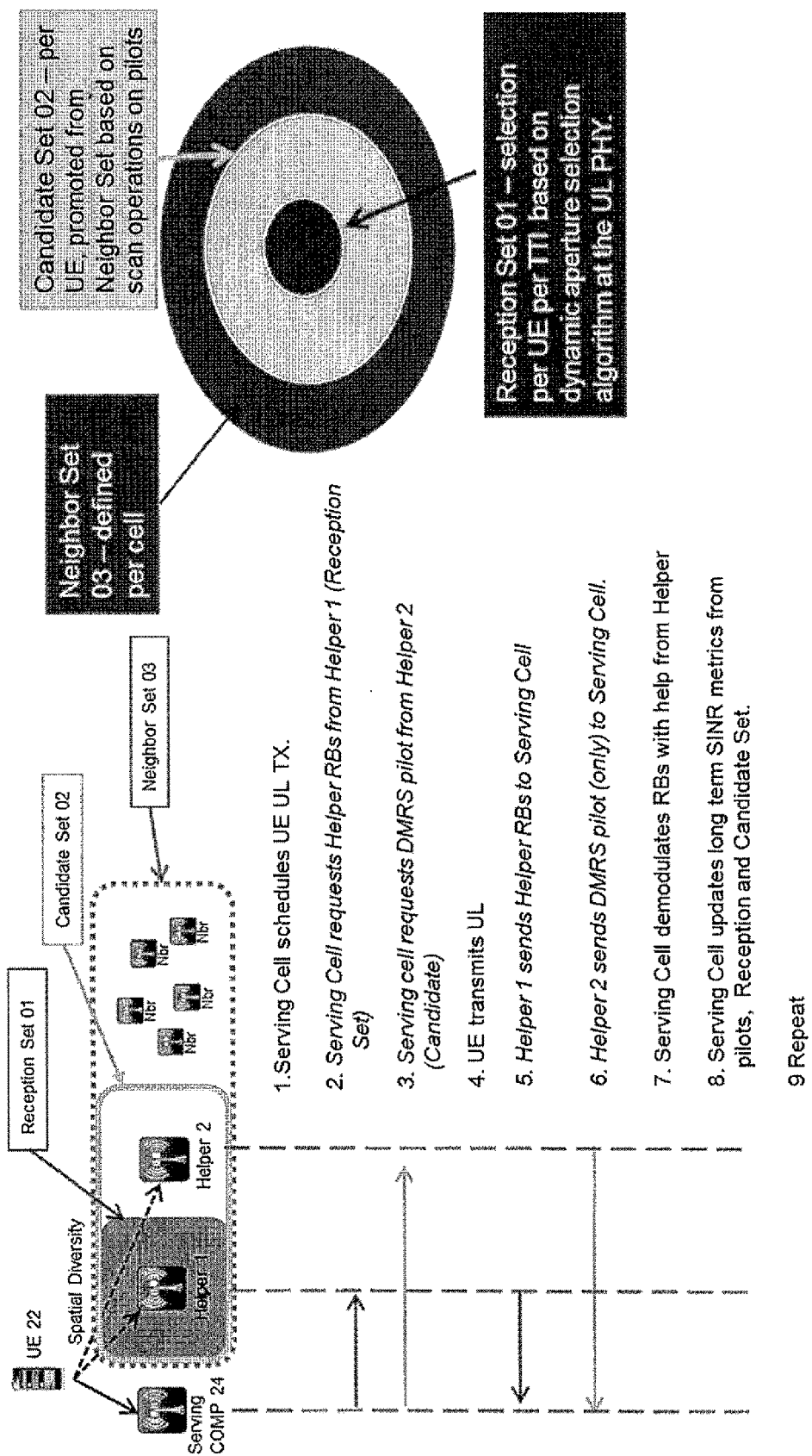
FIG. 5 further shows further details of dynamic helper cell selection in accordance with some embodiments of the invention.

FIG. 5 further shows further details of dynamic helper cell selection in accordance with some embodiments of the invention. As shown in FIG. 5 the Serving Cell schedules UE UL TX. The Serving Cell requests Helper RBs from Helper 1 (Reception Set). The Serving cell requests DMRS pilot from Helper 2 (Candidate). The UE transmits UL. The Helper 1 sends Helper RBs to Serving Cell. The Helper 2 sends DMRS pilot (only) to Serving Cell. The Serving Cell demodulates RBs with help from Helper. The Serving Cell updates long term SINR metrics from pilots, reception and candidate sets. Then the process can be repeated. It is noted that as similarly stated above the neighbour set is defined per cell; the candidate set is defined per UE and promoted from the neighbour set based on scan operations on pilots; and the reception set is selected per UE per TTI based on a dynamic aperture selection algorithm at the UL PHY.

Egress Bandwidth Control

A serving cell manages the helper cells specific to UE scheduled and makes requests for help whenever the UE is scheduled When making help requests the cells also provide egress control metric to the helper cell The egress control metric specifies how important the help is in decoding the user of interest.

In some embodiment of the invention, the serving cell determines egress control metrics, for example per TTI, for cells in reception set for a scheduled UL CoMP UE. The egress control metric is sent with the UE help request to the helper cell. When a helper cell determines that the total bandwidth of the help requests for a TTI exceeds its egress bandwidth capacity, it uses the egress control metric to prioritize which help requests to honor and which to discard.

The functions described above can be implemented independently of system architecture, hardware platforms, and type of node interconnection.

Function Implementation—Algorithms

The algorithms to implement these functionalities are given with an example. Consider an example with cluster of N-cells serving K-UEs/cell and are interconnected by backhaul network. The cell acts as both a serving cell and a helper cell.

Helper Cell Management Algorithms

A serving cell may maintain a list of candidate helper cells for active UE in the serving cell. When a UE is scheduled, the serving cell will request resource block (RB) help from a subset of the candidate set, called the "reception" set, and will request the DMRS pilot(s) for the UEs RB allocation from the remaining cells in the candidate set.

The DMRS pilots (the received signals only for DMRS pilots) are used to compute SINR of the serving UE at cells in the candidate set and maintain an IIR filtered SINK estimates. Let $S_{nj}^k$ represents the long-term or filtered SINR of the kth user served by jth cell and computed at helper cell-n. Once the reception set is decided for a user, the cell make decision on requesting for help with other cells. It is noted that in accordance with the example embodiments of the invention any values identified in this paper, for example j, k, m, n, p, s, and/or w, may be considered integers.

Egress Control Metric Calculation and Control Mechanism

For UE the serving cell computes an accumulated SINR corresponding to its helper cells and is represented as $\overline{S}_{mj}^k$ (the accumulated SINR for kth user served by jth cell requesting help from mth cell). The accumulated SINR $\overline{S}_{mj}^k$ is calculated as for kth user served by jth cell requesting the help from mth cell as, $$\overline{S}_{mj}^k = S_{jj}^k + \sum_{\substack{n \in HelperSet(k,j) \\ n \neq m}} S_{nj}^k p_{nj}$$

The $p_{nj}$ is the probability metric defined for pair of cells and is the probability that cell-n helping cell-j and is calculated using adaptive update over time as, $$p_{nj} = \alpha p_{nj} + (1-\alpha)\left(\frac{\text{Sum Bandwidth Received from Cell-}n \text{ to Cell-}j}{\text{Sum Bandwidth Requested by Cell-}j \text{ to Cell-}n}\right)$$

For example, the IIR filter co-efficient can be alpha=0.01. From the above SINR measurements, the serving cell calculates egress control metric (EGM) for users. The egress control metric for user-k served by cell-j, requesting help from cell-m is, $$EGM_{m,j}^k = \frac{w_j^k S_{mj}^k}{1 + \overline{S}_{mj}^k}$$

The serving cell can place a request for help with the helper cells along with the EGM A cell as a helper receive the requests and can arrange the requests in descending order and start giving out the help until the backhaul bandwidth is exhausted.

For egress control considering a K-cell scenario, as an example, there may be a cell-1 which is receiving requests from cells 2, 3, ... N. In this scenario there may be K users per cell and the bandwidth for the kth user in jth cell is $\beta_j^k$.

When the cell-1 is over-subscribed, the egress bandwidth control decision needs to be made. In sending the help request, the cells 2, 3, ..., N also send the accumulated SINR at the serving cell without taking cell-1 into account. Let $\overline{S}_{12}^k, \overline{S}_{13}^k, \ldots, \overline{S}_{1N}^k$ represent the accumulated SINR at cells 2, 3, ..., N respectively (excluding the SINR of those users at cell-1). Let $S_{12}^k, S_{13}^k, \ldots, S_{1N}^k$ represent the SINR measured at cell-1 for the users in cell-2, cell-3, ..., cell-N. Generally, $S_{ij}^k$ represents the SINR seen at cell-i for kth user in cell-j. This measurement is done at the serving cell with the pilot symbols from the helper.

Another egress control algorithm is described below:
serving cell computes an egress control metric for its users, the metric computed by serving cell-j for the helper cell-1 is, $$Metric_{1j}^k = \left( \frac{w_j^k S_{1j}^k}{1 + \overline{S}_{1j}^k} \right)$$

$w_j^k$ is i the scheduling priority weight of the user-k served by j-th cell for j=2, 3, N; and $$\overline{S}_{1j}^k = S_{jj}^k + \sum_{n \neq 1} S_{nj}^k p_{nj}$$

$p_{nj}$ is the probability that cell-n helps cell-j. At the helper cell, when it receives all the help requests along with egress control metric, the cell orders the metric numbers in descending order and allocate egress bandwidth to the users (e.g., UEs) from top until the egress limit is met.

Computing $p_{nj}$
While requesting for help the cells send accumulated SINR omitting the helper cell of interest $$\overline{S}_{mj}^k = S_{jj}^k + \sum_{\substack{n \in Helpers(k,j) \\ n \neq m}} S_{nj}^k p_{nj}$$

The cell-j computes the probability of receiving help from helper cell-m by adaptive update (e.g. in a TTI), $$p_{nj} \leftarrow \alpha p_{nj} + (1 - \alpha) \left( \frac{\text{Sum bandwidth received from cell-}n \text{ to cell-}j}{\text{Sum bandwidth requested from cell-}j \text{ by cell-}j} \right)$$

Where Alpha is the filtering constant and wherein Alpha is the filtering coefficient, can be a tunable parameter
The probability is calculated for cell-pair and $p_{nj} \neq p_{jn}$
Finally we will discuss two helper request methods that require egress control mechanism for sorting help requests at over-subscribed cells.

MAAS: In Multi-antenna aperture selection method, the serving cell selects the reception set for its users based on SINR thresholds. In certain deployments, some cells may get lot of help requests compared to other cells or in systems where egress bandwidth is constrained; all the requests may not be fulfilled. MAAS based request mechanism does not account for how the other cells are loaded in requesting for help. Hence, in MAAS mechanism, some cells may continuously send request for help from other cells but not get any help. Liquid MAAS is formulated as a mathematical optimization problem that makes optimal help requests by incorporating the bandwidth constraints such that total utility is maximized.

Quasi-time Liquid MAAS algorithm: An iterative solution to the Liquid MAAS problem is developed which involves multiple message exchange between the cells before convergence. Due to convergence issues of the iterative algorithm within a TTI, quasi-time-Liquid-MAAS is proposed where iterations are implemented across TTI's. In quasi-real-time implementation the help requests at a cell are not guaranteed to be within the egress limit and hence require an egress control mechanism to satisfy the requests.

In the Liquid-MAAS solution as discussed above there may be a distributed iterative algorithm with the following steps:
1) cell broadcasts to its neighbors, a notion of an egress price
   i. This measures how much of bandwidth requests it gets compared to what it can serve
2) cell takes egress prices, and does antenna and aperture selection
   i. Orders its helper cells according to a metric that includes SINR, user priority, user bw and egress price
   ii. Does aperture selection using this metric-ordered cells
   iii. If final aperture is more than allowed max aperture, computes iteratively an ingress price and by re-evaluating the aperture using a metric that accounts now for egress price, ingress price, SINR, user priority and user bw
   iv. This is internally iterated till the solution gives an aperture that is feasible (i.e., equal to aperture limit)
3) cell makes its request for help
4) helper cell collects these requests of requested bandwidth and updates egress price
   i. If requested egress bandwidth is more than max egress bandwidth, a cell increases it egress price proportional to the demand overhead.
   ii. If requested is less than max egress, then cell decreases its egress price proportional to demand underflow Go back to Step 1 and iterate till all cells meet their egress bandwidth limitation.

Figure 6:
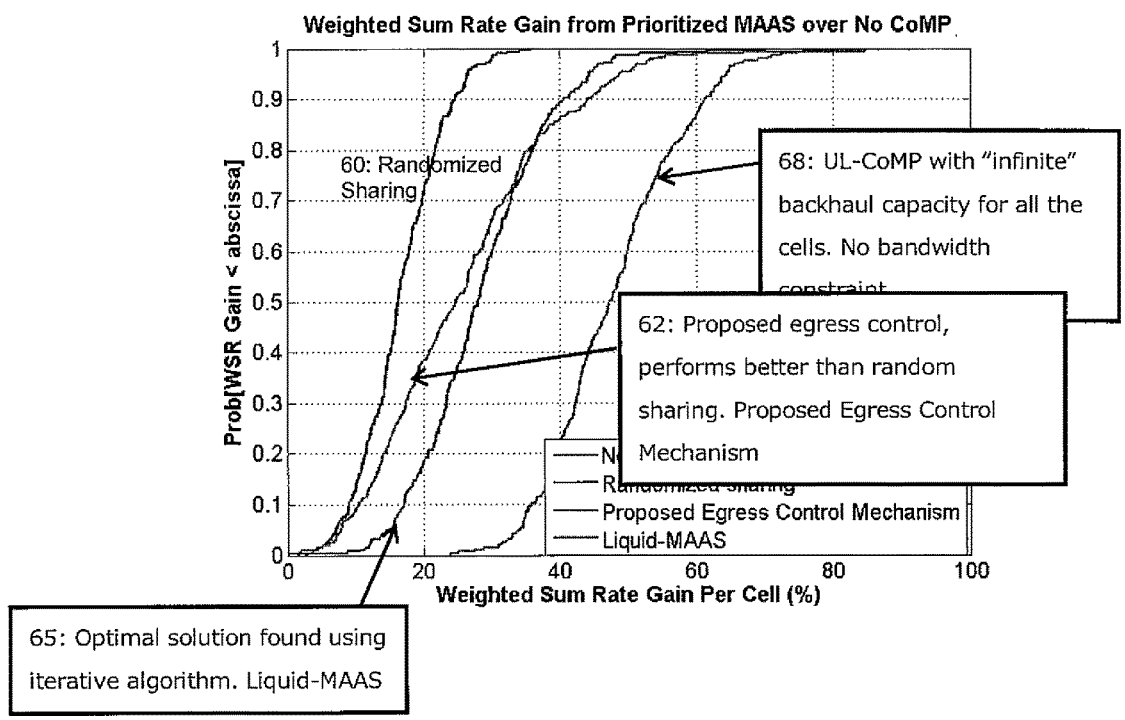
FIG. 6 shows weighted sum simulation results in accordance with some embodiments of the invention.

FIG. 6 shows weighted sum simulation results in accordance with some embodiments of the invention. As shown in FIG. 6 the interactive algorithm in accordance with the embodiments as shown with line 65 is an optimal solution. The optimal solution 65 performs better than the randomized sharing approach as shown with line 60, and is closer to the results of the UL_COMP with infinite backhaul capacity as shown with line 68. Further, the proposed egress control as shown with line 62 is also an improvement over the randomized sharing approach as shown with line 60.

It is noted that detail regarding an interactive method which can be used in accordance with some embodiments of the invention can be found in the applicant's application No. 60/062,422 filed in October of 2014.

Figure 7A:
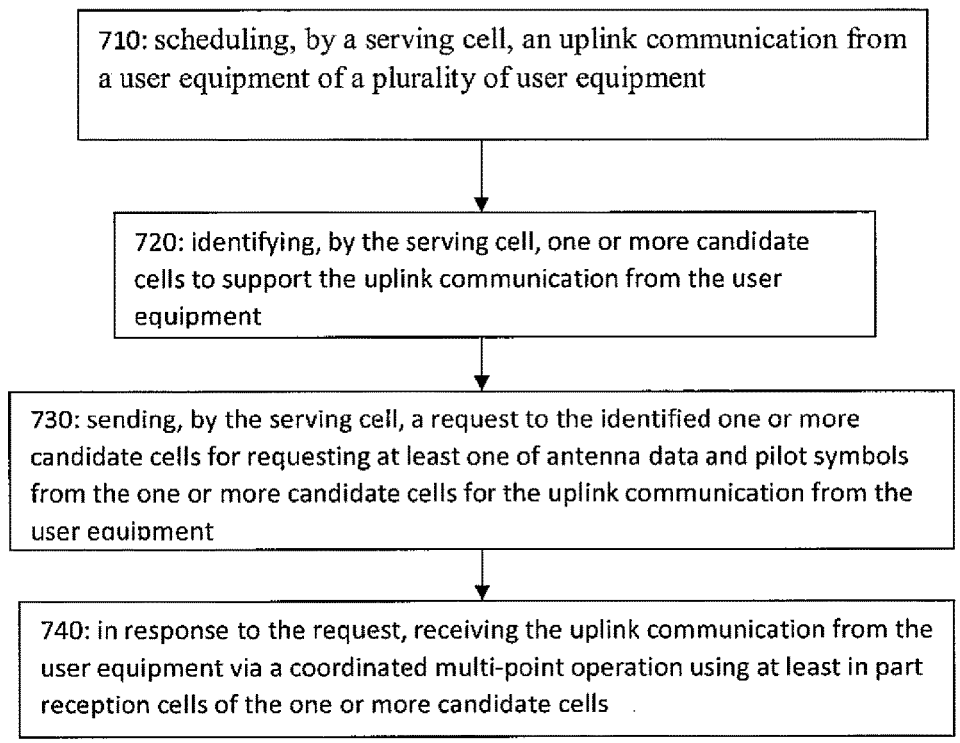
FIGS. 7A and 7B each show two methods in accordance with some embodiments which may be performed by an apparatus.

FIG. 7A illustrates operations which may be performed by a network device such as, but not limited to, a network device (e.g., the COMP24 as in FIG. 2). As shown in step 710 of FIG. 7A, there is scheduling, by a serving cell, an uplink communication from a user equipment of a plurality of user equipment. At step 720 of FIG. 7A there is identifying, by the serving cell, one or more candidate cells to support the uplink communication from the user equipment. At step 730 of FIG. 7A there is sending, by the serving cell, a request to the identified one or more candidate cells for requesting at least one of antenna data and pilot symbols from the one or more candidate cells for the uplink communication from the user equipment. Then at step 740 of FIG. 7A there is, in response to the request, receiving the uplink communication from the user equipment via a coordinated multi-point operation using at least in part reception cells of the one or more candidate cells.

In accordance with some embodiments as described in the paragraph above, the identifying one or more candidate cells comprises determining at least one of measurement reports and reference signal received power levels of cells neighboring the serving cell.

In accordance with some embodiments as described in the paragraphs above, the at least one of measurement reports and reference signal received power levels of cells is determined by the serving cell using a scanning function.

In accordance with some embodiments as described in the paragraphs above, the pilot symbols are used by the serving cell device to obtain infinite-impulse-response signal to interference and noise ratio metrics of one or more candidate cells for active user equipment of the plurality of user equipment.

In accordance with some embodiments as described in the paragraphs above, there is identifying, by the serving cell, a transmission time interval the reception cells of the candidate cells based on an egress bandwidth price function and the infinite-impulse-response (IIR) filtered signal to interference and noise ratio metrics for the candidate cells.

In accordance with some embodiments as described in the paragraphs above, an egress bandwidth price metric is determined for cells of the one or more candidate cells using at least the infinite-impulse-response signal to interference and noise ratio metrics, wherein the egress bandwidth price metric is provided to one or more candidate cells, and wherein the egress bandwidth price metric is used for prioritizing the requests from one or more cells.

In accordance with some embodiments as described in the paragraphs above, the egress bandwidth price metric is based on at least one of a quasi-real time liquid multi antenna aperture selection function and a liquid multi antenna aperture selection function.

In accordance with an embodiment of the invention as described above there is an apparatus comprising: means for scheduling [DP 24A], by a serving cell [COMP 24], an uplink communication from a user equipment [UE 22] of a plurality of user equipment. There is means for identifying [COMP processing 24G], by the serving cell [COMP 24], one or more candidate cells to support the uplink communication from the user equipment [UE 22]. There is means for sending [24F], by the serving cell [COMP 24], a request to the identified one or more candidate cells, the request comprising a request for at least one of antenna data and pilot symbols from the one or more candidate cells for the uplink communication from the user equipment. Further, there is means, in response to the help request, for receiving [Comp Proc 24G, and 24F] the uplink communication from the user equipment [UE22] via a coordinated multi-point operation using at least in part reception cells of the one or more candidate cells.

In accordance with an embodiment as described in the paragraph above, the identifying one or more candidate cells comprises determining at least one of measurement reports and reference signal received power levels of cells neighboring the serving cell.

In accordance with some embodiments as described in the paragraphs above, the at least one of measurement reports and reference signal received power levels of cells is determined by the serving cell using a scanning function.

In accordance with some embodiments as described in the paragraphs above, the pilot symbols are used by the serving cell to obtain infinite-impulse-response signal to interference and noise ratio metrics of the one or more candidate cells for active user equipment of the plurality of user equipment.

In accordance with some embodiments as described in the paragraphs above, there is identifying, by the serving cell, at a transmission time interval the reception cells of the candidate cells based on an egress bandwidth price function and the infinite-impulse-response signal to interference and noise ratio metrics of one or more of the candidate cells.

In accordance with some embodiments as described in the paragraphs above, an egress bandwidth price metric is determined for the one or more candidate cells using at least the infinite-impulse-response signal to interference and noise ratio metrics, wherein the egress bandwidth price metric is provided to the one or more candidate cells, and wherein the egress bandwidth price metric is used for prioritizing the requests from one or more serving cells.

In accordance with some embodiments as described in the paragraphs above, the egress bandwidth price metric is based on at least one of a quasi-real time liquid multi antenna aperture selection function and a liquid multi antenna aperture selection function.

Figure 7B:
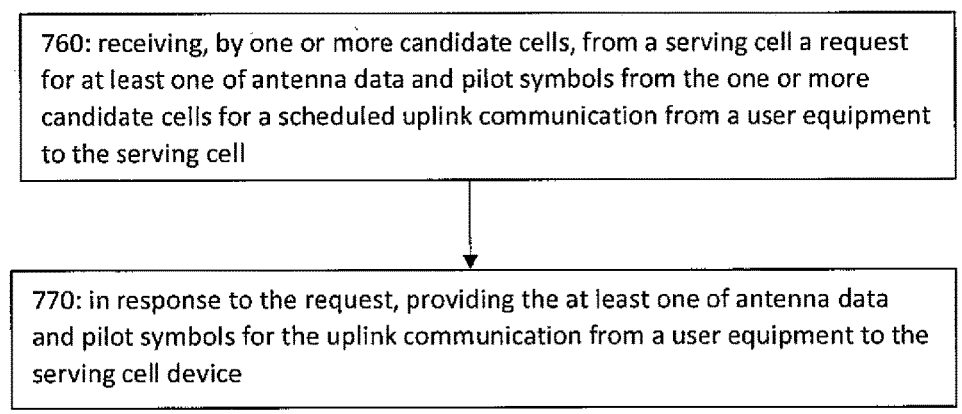

FIG. 7B illustrates operations which may be performed by a network device such as, but not limited to, a network device (e.g., COMP 24 as in FIG. 2). As shown in step 760 of FIG. 7B, there is receiving, by one or more candidate cells, from a serving cell a request for at least one of antenna data and pilot symbols from the one or more candidate cells for a scheduled uplink communication from a user equipment to the serving cell. Then at step 770 of FIG. 7B there is, in response to the request, providing the at least one of antenna data and pilot symbols for the uplink communication from a user equipment to the serving cell.

In accordance with an embodiment as described in the paragraph above, the pilot symbols are for use by the serving cell to obtain infinite-impulse-response signal to interference and noise ratio metrics of the one or more candidate cells for active user equipment of the plurality of user equipment.

In accordance with some embodiments as described in the paragraphs above, there is an egress bandwidth price metric is determined per transmission time interval by the candidate cell using at least the infinite-impulse-response signal to interference and noise ratio metrics, and wherein the egress bandwidth price metric is used for prioritizing the requests from one or more serving cells.

In accordance with some embodiments as described in the paragraphs above, there is determining by the candidate cell whether a total bandwidth required for the request for a transmission time interval exceeds an egress bandwidth capacity of the candidate cell.

In accordance with some embodiments as described in the paragraphs above, there is based on determining that the total bandwidth exceeds the egress control metric of the candidate cell then disregarding the request, else enabling the uplink communication from the user equipment to the serving cell via a coordinated multi-point operation.

In accordance with some embodiments as described in the paragraphs above, the determined egress bandwidth capacity is based on at least one of a quasi-real time liquid multi antenna aperture selection function and a liquid multi antenna aperture selection (MAAS).

In accordance with an embodiment of the invention as described above there is an apparatus comprising: means for receiving, by one or more candidate cells [e.g., eNB 21 and eNB 20], from a serving cell [COMP 24] a request comprising a request for at least one of antenna data and pilot symbols from the one or more candidate cells for a scheduled uplink communication from a user equipment to the serving cell. Further, there is means, in response to the help request, for providing [DP21A and/or DP 20A, and 21F and/or 20F] the at least one of antenna data and pilot symbols for the uplink communication from a user equipment [UE 22] to the serving cell [COMP 24].

In accordance with some embodiments as described in the paragraph above, the pilot symbols are for use by the serving cell to obtain infinite-impulse-response (IIR) filtered signal to interference and noise ratio metrics of the one or more candidate cells of active user equipment of the plurality of user equipment.

In accordance with some embodiments as described in the paragraphs above, an egress bandwidth price metric is determined per transmission time interval for one or more candidate cells using at least the infinite-impulse-response filtered signal to interference and noise ratio metrics, and wherein the egress bandwidth price metric is used for prioritizing the requests from one or more serving cells.

In accordance with some embodiments as described in the paragraphs above, there is means for determining at each candidate cell of the one or more candidate cells whether a total bandwidth required for the request for a transmission time interval exceeds an egress bandwidth capacity of the candidate cell.

In accordance with some embodiments as described in the paragraphs above, there is based on determining that the total bandwidth exceeds the egress control metric of the candidate cell then disregarding the request, else enabling the uplink communication from the user equipment to the serving cell device via a coordinated multi-point operation using at least in part a reception cells of the one or more candidate cells.

In accordance with some embodiments as described in the paragraphs above, the determined egress bandwidth capacity is based on at least one of a quasi-real time liquid multi antenna aperture selection function and a liquid multi antenna aperture selection function.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "example" is used herein to mean "serving as an example, instance, or illustration." Any embodiment described herein as "example" is not necessarily to be construed as preferred or advantageous over other embodiments. All of the embodiments described in this Detailed Description are example embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   scheduling, by a serving cell, an uplink communication from a user equipment of a plurality of user equipment;
   selecting, by the serving cell, from a determined set of reception cells neighboring the serving cell one or more candidate cells to support the uplink communication from the user equipment during a transmission time interval;
   sending, by the serving cell, a request to the selected one or more candidate cells for requesting at least one of antenna data and pilot symbols from the one or more candidate cells for the uplink communication from the user equipment; and
   in response to the request, receiving the uplink communication from the user equipment during the transmission time interval via a coordinated multi-point operation using at least in part the reception cells of the one or more candidate cells.

2. The method according to claim 1, wherein the set of reception cells is determined based on at least one of measurement reports and reference signal received power levels per transmission time interval of each cell of the set of cells.

3. The method according to claim 2, wherein the at least one of measurement reports and reference signal received power levels of cells is determined by the serving cell using a scanning function.

4. The method according to claim 1, wherein the pilot symbols are used by the serving cell to obtain infinite-impulse-response (IIR) filtered signal to interference and noise ratio metrics of the one or more candidate cells for active user equipment of the plurality of user equipment.

5. The method according to claim 4, further comprising identifying, by the serving cell, at the transmission time interval the reception cells of the one or more candidate cells based on an egress bandwidth price function and the infinite-impulse-response filtered signal to interference and noise ratio metrics of one or more of the one or more candidate cells.

6. The method according to claim 4, wherein an egress bandwidth price metric is determined for the one or more candidate cells using at least the infinite-impulse-response filtered signal to interference and noise ratio metrics, wherein the egress bandwidth price metric is provided to the one or more candidate cells, and wherein the egress bandwidth price metric is used for prioritizing the requests from one or more serving cells.

7. The method according to claim 6, wherein the egress bandwidth price metric is based on at least one of a quasi-real time liquid multi antenna aperture selection function and a liquid multi antenna aperture selection function.

8. An apparatus comprising:
at least one processor; and
at least one memory including computer program code, where the at least one memory and the computer program code are configured, with the at least one processor, to cause the apparatus to at least:
schedule an uplink communication from a user equipment of a plurality of user equipment;
select from a determined set of reception cells neighboring the serving cell one or more candidate cells to support the uplink communication from the user equipment during a transmission time interval;
send a request to the selected one or more candidate cells, for requesting at least one of antenna data and pilot symbols from the one or more candidate cells for the uplink communication from the user equipment; and
in response to the request, receive the uplink communication from the user equipment during a transmission time interval via a coordinated multi-point operation using at least in part the reception cells of the one or more candidate cells.

9. The apparatus according to claim 8, wherein the set of reception cells is determined based on at least one of measurement reports and reference signal received power levels per transmission time interval of each cell of the set of cells.

10. The apparatus according to claim 9, wherein the at least one of measurement reports and reference signal received power levels of cells is determined by the serving cell using a scanning function.

11. The apparatus according to claim 8, wherein the pilot symbols are used by the apparatus to obtain infinite-impulse-response filtered signal to interference and noise ratio metrics of the one or more candidate cells for active user equipment of the plurality of user equipment.

12. The apparatus according to claim 11, wherein the at least one memory including the computer program code is configured with the at least one processor to cause the apparatus to identify at a transmission time interval the reception cells of the one or more candidate cells based on an egress bandwidth price function and the infinite-impulse-response filtered signal to interference and noise ratio metrics of the one or more candidate cells.

13. The apparatus according to claim 11, wherein the at least one memory including the computer program code is configured with the at least one processor to cause the apparatus to:
determine an egress bandwidth price metric for the one or more candidate cells using at least the infinite-impulse-response filtered signal to interference and noise ratio metrics, wherein the egress bandwidth price metric is provided to the one or more candidate cells, and wherein the egress bandwidth price metric is used for prioritizing the requests from one or more serving cells.

14. The apparatus according to claim 12, wherein the egress bandwidth price metric is based on at least one of a quasi-real time liquid multi antenna aperture selection function and a liquid multi antenna aperture selection function.

15. An apparatus comprising:
at least one processor; and
at least one memory including computer program code, where the at least one memory and the computer program code are configured, with the at least one processor, to cause the apparatus to at least:
receive, by one or more candidate cells, from a serving cell a request for at least one of antenna data and pilot symbols from the one or more candidate cells for a scheduled uplink communication from a user equipment to the serving cell, wherein the one or more candidate cells are of a set of reception cells, neighboring the serving cell, determined based on at least one of measurement reports and reference signal received power levels of each cell of the set of cells during a transmission time interval; and
in response to the request, provide the at least one of antenna data and pilot symbols for the uplink communication from a user equipment to the serving cell during the transmission time interval.

16. The apparatus according to claim 15, wherein the pilot symbols are for use by the serving cell to obtain infinite-impulse-response signal to interference and noise ratio metrics of the one or more candidate cells for active user equipment of the plurality of user equipment.

17. The apparatus according to claim 16, wherein the at least one memory including the computer program code is configured with the at least one processor to cause the apparatus to:
determine an egress bandwidth price metric per transmission time interval for the one or more candidate cells using at least the infinite-impulse-response signal to interference and noise ratio metrics, and wherein the egress bandwidth price metric is used for prioritizing the requests from one or more serving cells.

18. The apparatus according to claim 17, wherein the at least one memory including the computer program code is configured with the at least one processor to cause the apparatus to determine at the one or more candidate cells whether a total bandwidth required for the request for a transmission time interval exceeds an egress bandwidth capacity of the candidate cell.

19. The apparatus of claim 18, wherein the at least one memory including the computer program code is configured with the at least one processor to cause the apparatus to:
based on determining that the total bandwidth exceeds the egress control metric of the candidate cell then disregard the request, else enabling the uplink communication from the user equipment to the serving cell via a coordinated multi-point operation.

20. The apparatus according to claim 18, wherein the determined egress bandwidth capacity is based on at least one of a quasi-real time liquid multi antenna aperture selection function and a liquid multi antenna aperture selection function.

* * * * *